United States Patent
Koehane et al.

(10) Patent No.: US 7,496,847 B2
(45) Date of Patent: Feb. 24, 2009

(54) DISPLAYING A COMPUTER RESOURCE THROUGH A PREFERRED BROWSER

(75) Inventors: Susann Marie Koehane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 10/834,499

(22) Filed: Apr. 29, 2004

(65) Prior Publication Data

US 2005/0246444 A1    Nov. 3, 2005

(51) Int. Cl.
    *G06F 3/00*    (2006.01)
(52) U.S. Cl. ...................................... 715/738
(58) Field of Classification Search ................ 709/227
    See application file for complete search history.

(56) References Cited

U.S. PATENT DOCUMENTS

| | | | |
|---|---|---|---|
| 5,974,460 A | 10/1999 | Maddalozzo, Jr. et al. | |
| 6,105,029 A | 8/2000 | Maddalozzo, Jr. et al. | |
| 6,178,460 B1 | 1/2001 | Maddalozzo, Jr. et al. | |
| 6,484,156 B1* | 11/2002 | Gupta et al. | 707/1 |
| 2001/0018349 A1* | 8/2001 | Kinnunen et al. | 455/456 |
| 2001/0056460 A1* | 12/2001 | Sahota et al. | 709/201 |
| 2002/0143859 A1* | 10/2002 | Kuki et al. | 709/203 |
| 2002/0198962 A1* | 12/2002 | Horn et al. | 709/218 |
| 2003/0154261 A1* | 8/2003 | Doyle et al. | 709/218 |
| 2003/0236799 A1 | 12/2003 | Koehane | |

* cited by examiner

*Primary Examiner*—Stephen Hong
*Assistant Examiner*—Samir Termanini
(74) *Attorney, Agent, or Firm*—H. Artoush Ohanian; Matthew Talpis; Biggers & Ohanian LLP (57) ABSTRACT

Displaying a computer resource through a preferred browser, including invoking a URL that identifies a computer resource; identifying, among a plurality of available browsers, a preferred browser for the resource; and displaying the resource through the preferred browser. Typical embodiments also include storing the URL in association with an identification of the preferred browser. In such embodiments, identifying a preferred browser for the resource also includes identifying the preferred browser in dependence upon the URL. Identifying the preferred browser may include requesting the resource through a default browser and receiving the resource in the default browser, the resource having meta-data comprising an identification of the preferred browser. Such embodiments also typically include storing the URL in association with the identification of the preferred browser.

9 Claims, 5 Drawing Sheets

DISPLAYING A COMPUTER RESOURCE THROUGH A PREFERRED BROWSER

BACKGROUND OF THE INVENTION

1. Field of the Invention

The field of the invention is data processing, or, more specifically, methods, systems, and products for displaying a computer resource through a preferred browser.

2. Description of Related Art

The difference in functionality and standards adoption between competing browser software providers has resulted in a situation where some web pages and links work better in one vendor's browser than another. Desktop applications, however, require users to set a single web browser as a default to be invoked each time an application requires a browser to display HTML information, despite the fact that such a default browser is known to be less capable than others for display of certain web pages and links.

SUMMARY OF THE INVENTION

Methods, systems, and products are disclosed for displaying a computer resource through a preferred browser, thereby improving the chances that a software application has the capability of displaying a resource through a browser and a version of the browser that is actually preferred for the resource. More particularly, methods, systems, and products are disclosed for displaying a computer resource through a preferred browser that include invoking a URL that identifies a computer resource; identifying, among a plurality of available browsers, a preferred browser for the resource; and displaying the resource through the preferred browser. In typical embodiments, invoking a URL includes invoking a hyperlink or entering the URL in an address bar in a GUI toolbar of a software application program. Typical embodiments also include storing the URL in association with an identification of the preferred browser. In such embodiments, identifying a preferred browser for the resource also includes identifying the preferred browser in dependence upon the URL.

In other embodiments, identifying the preferred browser includes requesting the resource through a default browser and receiving the resource in the default browser, the resource having meta-data comprising an identification of the preferred browser. Such embodiments also typically include storing the URL in association with the identification of the preferred browser.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for displaying a computer resource through a preferred browser. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Displaying a Computer Resource Through a Preferred Browser

Figure 1:
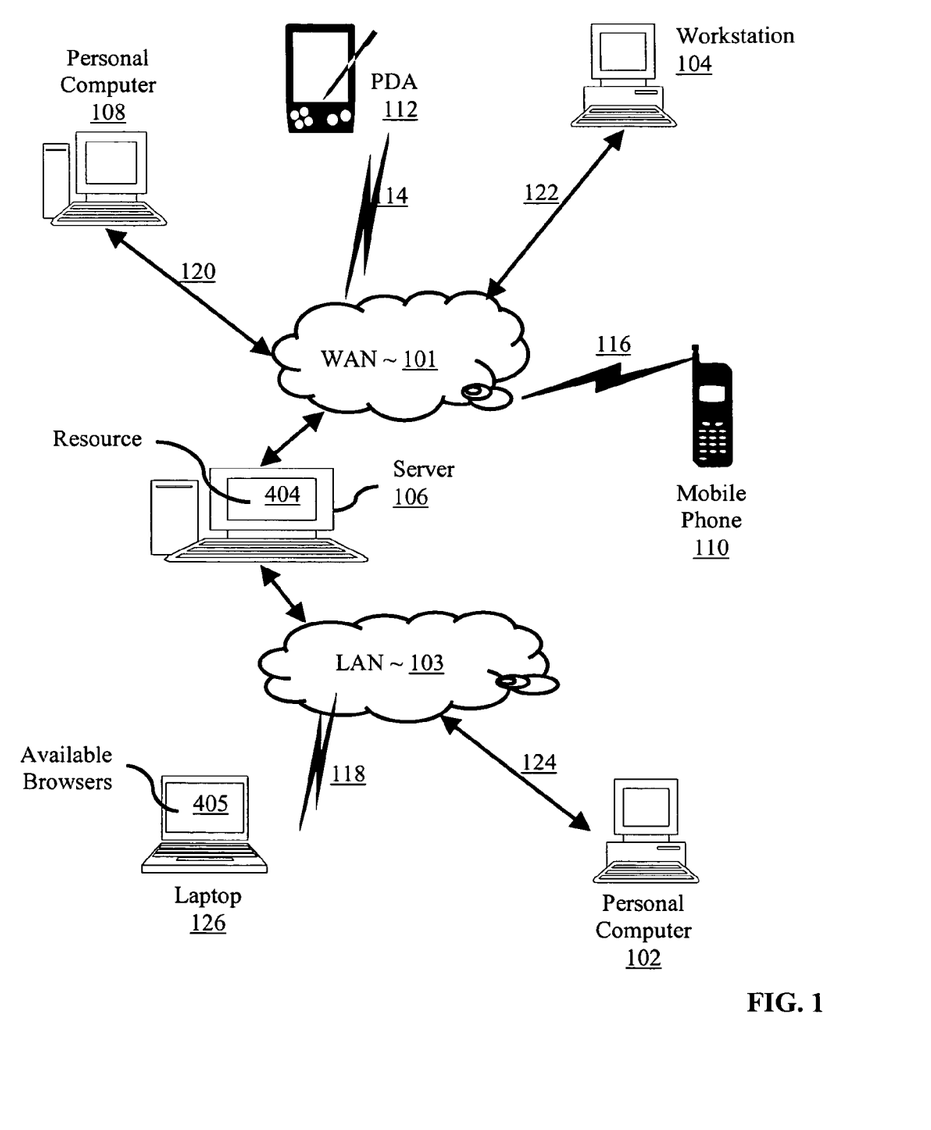
FIG. 1 depicts an exemplary data processing system capable of displaying a computer resource through a preferred browser.

Exemplary methods, systems, and products for displaying a computer resource through a preferred browser are now explained with reference to the accompanying drawings, beginning with FIG. 1. FIG. 1 depicts an exemplary data processing system capable of displaying a computer resource through a preferred browser according to embodiments of the present invention. The system of FIG. 1 includes a number of computers connected for data communications in networks. Each of the computers of the system of FIG. 1 may have a plurality of available browsers (405) installed upon it, and any available browsers may be identified as a preferred browser for a resource (404) identified by URL. The data processing system of FIG. 1 includes wide area network ("WAN") (101) and local area network ("LAN") (103). The network connection aspect of the architecture of FIG. 1 is only for explanation, not for limitation. In fact, systems for displaying a computer resource through a preferred browser according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, server (106) implements a gateway, router, or bridge between LAN (103) and WAN (101). In this example, a computer resource (404) is made available through server (106). Resource (404) may be any computer resource whose location may be specified by a URL. That is, in this specification 'computer resource' or 'resource' refers to any aggregation of information identified by URL for display through a preferred browser according to various embodiments of the present invention. In fact, the 'R' in 'URL' stands for 'resource.' Network communications protocols generally, for example, HTTP, TCP/IP, and so on, transmit resources, not just files. The most common kind of resource is a file, but resources include dynamically-generated query results as well, such as the output of CGI ('Common Gateway Interface') scripts, Java servlets, dynamic server pages, documents available in several languages, and so on. In effect, a resource is somewhat to a file, but more general in nature. Resources implemented as files include static web pages, graphic image files, video clip files, audio clip files, and so on. As a practical matter, most resources are currently either files or server-side script output. Server side script output includes output from CGI programs, Java servlets, Active Server Pages, Java Server Pages, and so on.

Server (106) may be any computer capable of accepting a request for a resource and responding by providing the resource to the requester. One example of such a server is an HTTP ('HyperText Transport Protocol') server or 'web server.'

In the example of FIG. 1, several exemplary devices including a PDA (112), a computer workstation (104), a mobile phone (110), and personal computer (108) are connected to WAN (101). Network-enabled mobile phone (110) connects to WAN (101) through wireless link (116), and PDA (112) connects to network (101) through wireless link (114). In the example of FIG. 1, personal computer (108) connects through wireline connection (120) to WAN (101), and computer workstation (104) connects through wireline connection (122) to WAN (101). Laptop (126) connects through wireless link (118) to LAN (103), and personal computer (102) connects through wireline connection (124) to LAN (103). In the system of FIG. 1, exemplary devices (120, 112, 104, 110, 126, and 102) support more than one browser and are capable of displaying a computer resource through a preferred browser in accordance with the present invention by invoking a URL that identifies a computer resource (404) on the server (106), identifying, among a plurality of available browsers installed on the device, a preferred browser for the resource, and displaying the resource (404) through the preferred browser (407).

'Browser,' as the term is used in this specification, generally means a web browser, a software application for locating, requesting, retrieving, and displaying computer resources in the form of static or dynamic web pages or server-side scripting output. Browsers typically comprise both a markup language interpreter, web page display routines, and an HTTP communications client. Typical browsers today can display text, graphics, audio and video. Browsers are operative in any computer capable of data communications including web-enabled devices, wireless web-enabled devices, microcomputers, PDAs, laptops, and so on. Browsers in wireless web-enabled devices often are downsized browsers called "microbrowsers." Browsers typically support not only HTML (the 'HyperText Markup Language'), but other markup languages as well, including for example, XML (the 'eXtensible Markup Language'), and, in the case of wireless web-enabled devices, WML (the 'Wireless Markup Language') and HDML (the 'Handheld Device Markup Language').

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

Figure 2:
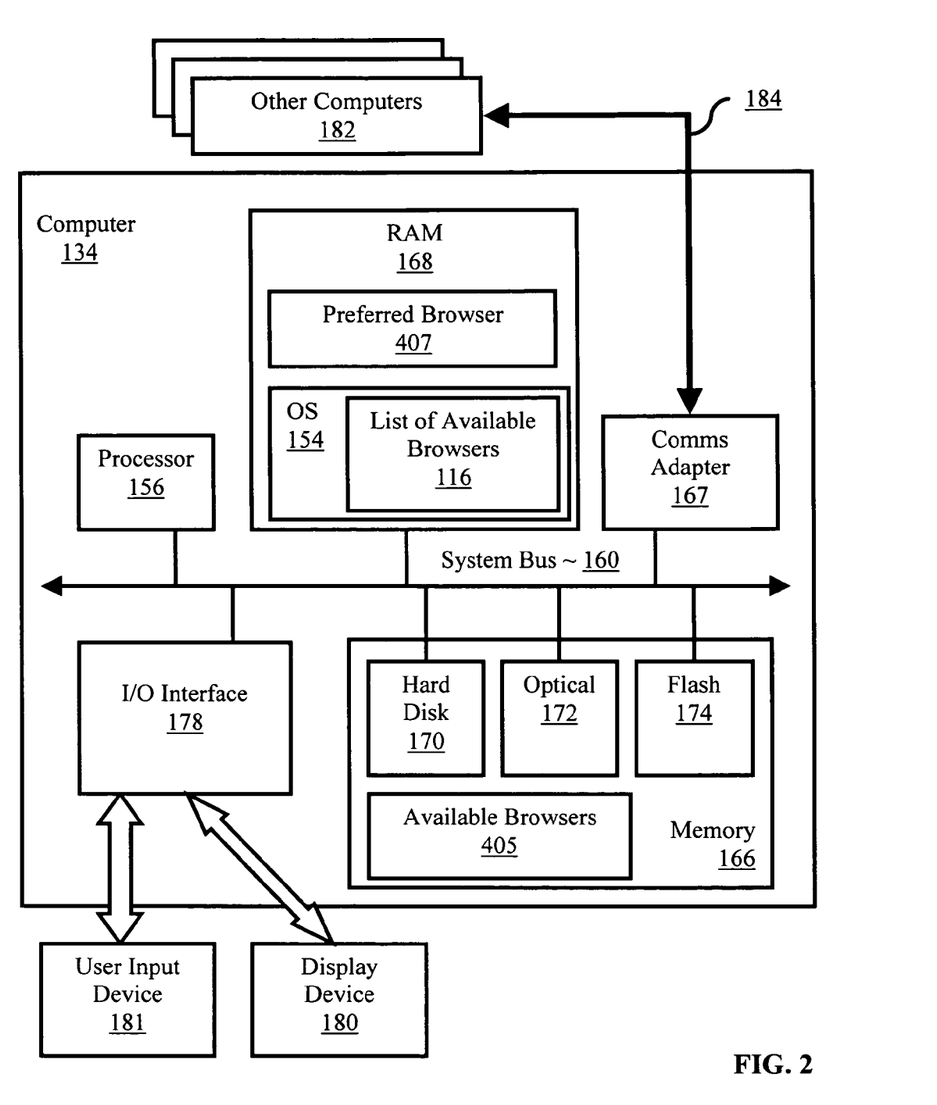
FIG. 2 sets forth a block diagram of automated computing machinery comprising a computer useful in displaying a computer resource through a preferred browser.

As mentioned above, displaying a computer resource through a preferred browser in accordance with the present invention is generally implemented with computers, that is, with automated computing machinery. For further explanation, FIG. 2 sets forth a block diagram of automated computing machinery comprising a computer (134) useful in displaying a computer resource through a preferred browser according to embodiments of the present invention. The computer (134) of FIG. 2 includes at least one computer processor (156) or 'CPU' as well as random access memory (168) ("RAM"). Stored in RAM (168) is a preferred browser (407) and a list (116) of available browsers. Available browsers (405) in the example of FIG. 2 are stored in non-volatile memory (166), that is, for example, on a hard disk (170), on an optical media (172), in EEPROM memory (174), or otherwise as will occur to those of skill in the art. Also stored in RAM (168) is an operating system (154). Operating systems useful in computers according to embodiments of the present invention include Unix, Linux, Microsoft NT™, and many others as will occur to those of skill in the art. Operating system (154) in the example of FIG. 2 is shown in RAM (154), but many components of an operating system typically are stored in non- volatile memory (166) also.

The computer (134) of FIG. 2 includes non-volatile computer memory (166) coupled through a system bus (160) to processor (156) and to other components of the computer storing a plurality of available browsers (405). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary computer (134) of FIG. 2 includes a communications adapter (167) for implementing connections for data communications (184), including connections through networks, to other computers (182), including servers, clients, and others as will occur to those of skill in the art. Communications adapters implement the hardware level of connections for data communications through which local devices and remote devices or servers send data communications directly to one another and through networks. Examples of communications adapters useful for displaying a computer resource through a preferred browser according to embodiments of the present invention include modems for wired dial-up connections, Ethernet (IEEE 802.3) adapters for wired LAN connections, and 802.11b adapters for wireless LAN connections.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

Figure 3:
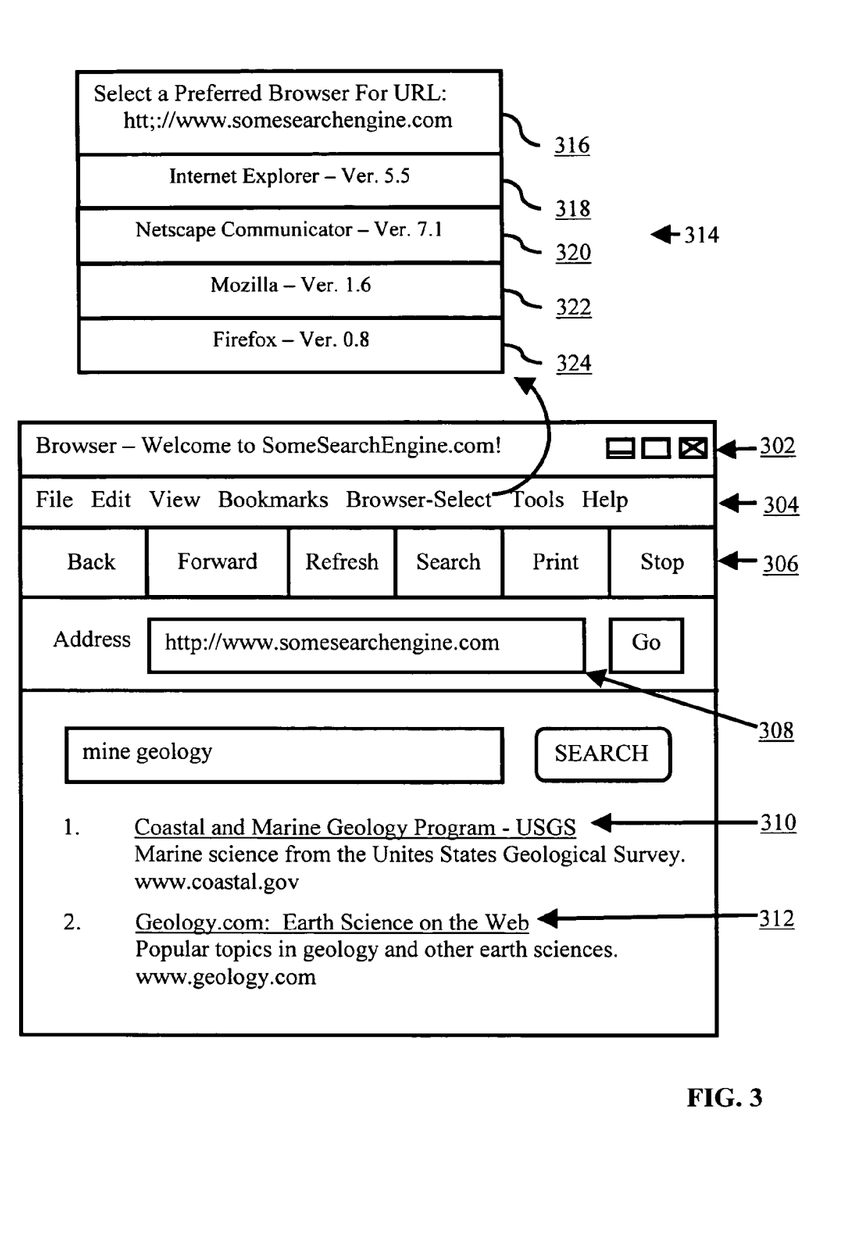
FIG. 3 depicts a graphical user interface ('GUI') of an exemplary software application program, for example, a browser.

FIG. 3 depicts a graphical user interface ('GUI') of an exemplary software application program, more particularly, in the example of FIG. 3, a browser. The browser of FIG. 3 is an example of a software product improved according to embodiments of the present invention, that is, programmed at the source code level or modified with a plug-in, to invoke a URL that identifies a computer resource, identify a preferred browser for the resource, and display the resource through the preferred browser. The example of FIG. 3 is taken as a browser for convenience of explanation, not for limitation. In fact, any software program may be improved according to embodiments of the present invention to display a computer resource through a preferred browser, including, for example, word processor programs, spreadsheet programs, database management tools, and, of course, browsers.

The browser of FIG. 3, as depicted, has been operated to point to a web site named "SomeSearchEngine.com," as shown in the title bar of the browser display (302). The browser of FIG. 3 includes a GUI toolbar (306) with a Back button, a Forward button, and buttons for refreshing the display, searching, printing, and stopping web page retrievals. The browser of FIG. 3 also includes a horizontal menu (304) containing the menu items File, Edit, View, Bookmark (called 'Favorites' on some browsers), Browser-Select, Tools, and Help. The exemplary browser of FIG. 3 includes an address bar (308), and invoking the URL identifying the displayed web page may be carried out by entering the URL in a browser's address bar (308) and invoking the GUI Go button in the address bar with a mouseclick or carriage return.

The displayed web page also includes hyperlinks (310 and 312) to resources identified and returned by the web site SomeSearchEngine.com in response to a search query 'mine geology.' A 'hyperlink' is a reference to a URL which when invoked requests access to a resource identified by the URL. The term 'hyperlink' in this specification includes links to URLs effected through anchor elements, as well as 'Back' and 'Forward' buttons on a toolbar in a GUI of a software application program. An anchor element is a markup language element that identifies and implements a hyperlink. An exemplary form of an anchor element, here expressed in HTML, is:

<a href="\\SrvrX\DocY">Press Here For Document Y</a>

This example anchor element includes a start tag <a>, and end tag </a>, an href attribute that identifies the target of the link as a document named 'DocY' on a web server named 'SrvrX,' and an anchor. The "anchor" is the display text that is set forth between the start tag and the end tag. That is, in this example, the anchor is the text "Press Here For Document Y." In typical usage, the anchor is displayed in highlighting, underscored, inverse, specially colored, or some other fashion setting it apart from other screen text and identifying it as an available hyperlink. In addition, the screen display area of the anchor is sensitized to user interface operations such as GUI pointer operations such as mouseclicks. In typical operation, a user points to the anchor with a mouse pointer or other GUI pointer, clicks on the anchor to invoke the link, and the browser then retrieves and displays Document Y from server SrvrX. The 'anchor element' is the entire markup from the start tag to the end tag. In the example of FIG. 3, hyperlink (310) is depicted with anchor "Coastland Marine Geology Program—USGS" and hyperlink (312) is depicted with anchor "Geology.com: Earth Science on the Web."

In the exemplary browser of FIG. 3, the menu entry called Browser-Select is programmed to display a pull-down menu (314) used to associate a preferred browser with the URL identifying the displayed resource. The Browser-Select option supports a user's selecting a preferred browser for a resource identified by a URL according to embodiments of the present invention. In the example of FIG. 3, the menu displays the URL identifying the displayed resource (316), and a list of available browsers for selection as the preferred browser for displaying the resource. In the example of FIG. 3, the available browsers include Internet Explorer version 5.5 (318), Netscape Communicator version 7.1 (320), Mozilla version 1.6 (322), and Firefox version 0.8 (324). In the example of FIG. 3, a user selects a preferred browser to display the resource identified by the URL http://www-.somesearchengine.com from the available browsers (318, 320, 322, and 324).

TABLE 1

URLs and Preferred Browsers

| URL | Preferred Browser |
| --- | --- |
| http://www.somesearchengine.com | c:\programs\explorer\iexplore.exe |
| http://www.aWebsite.com | c:\programs\mozilla\mozilla1.6.exe |
| http://www.anotherWebsite.com | c:\programs\mosaic\mosaic.exe |

Table 1 shows an example of URLs stored in association with identifications of preferred browsers. Table 1 includes a record storing the URL "http://www.somesearchengine.com" in association with the identification of a preferred browser: "c:\programs\explorer\iexplore.exe." The association of the URL "http://www.somesearchengine.com" with the identification of a preferred browser "c:\programs\explorer\iexplore.exe" is the storage and association that would result, for example, from a user's selecting the entry for Internet Explorer—Vers. 5.5 (318) from the pull-down menu (314) of FIG. 3. Table 1 includes a record storing the URL "http://www.aWebsite.com" in association with the identification of a preferred browser: "c:\programs\mozilla\mozilla1.6.exe." Table 1 includes a record storing the URL "http://www.anotherWebsite.com" in association with the identification of a preferred browser: "c:\programs\mosaic\mosaic.exe." In the example of Table 1, the identifications of preferred browsers are implemented as pathnames of a program executable on a local file system. Such identification is for explanation, not for limitation. In fact, embodiments of the invention may implement identifications of preferred browsers in any way that will occur to those of skill in the art, including, for example, through URLs.

Figure 4:
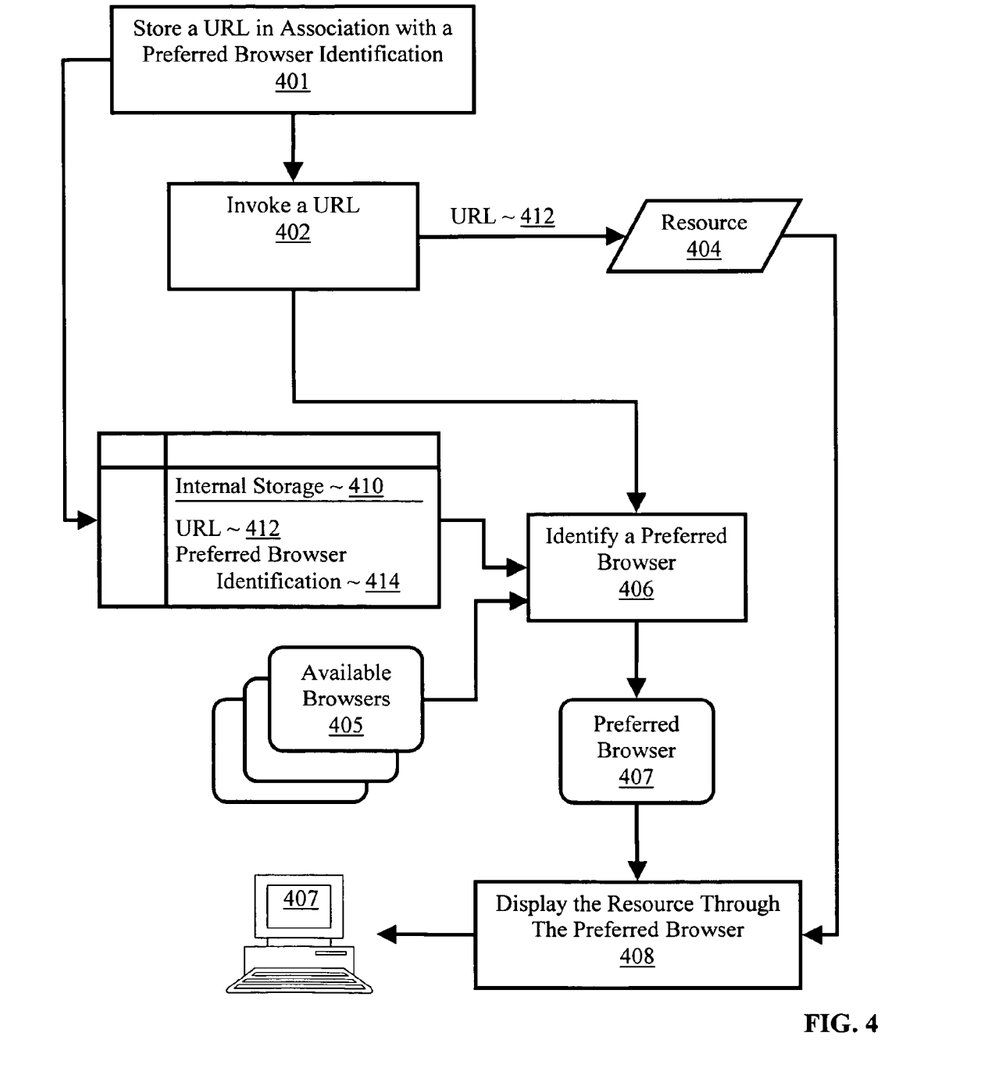
FIG. 4 sets forth a flow chart depicting an exemplary method of displaying a computer resource through a preferred browser.

For further explanation, FIG. 4 sets forth a flow chart depicting an exemplary method of displaying a computer resource through a preferred browser that includes invoking (402) a URL (412) that identifies a computer resource (404), identifying (406), among a plurality of available browsers (405), a preferred browser (407) for the resource, and displaying (408) the resource (404) through the preferred browser (407). In the method of FIG. 4, invoking (402) a URL may be carried out by invoking a hyperlink, by entering the URL in a browser's address bar, by entering the URL in an address bar in a GUI toolbar of a software application program, or in other ways as will occur to those of skill in the art.

The method of FIG. 4 also includes storing (401) a URL (412) in association with an identification (414) of a preferred browser for the resource identified by the URL. Storing (401) the URL (412) in association with an identification (414) of the preferred browser may be carried out, for example, by use of a hash table, a linked list, or a table such as the one illustrated above as Table 1. In the method of FIG. 4, identifying (406) a preferred browser (407) for the resource is carried out by identifying the preferred browser in dependence upon the URL (412). Identifying (406) the preferred browser in dependence upon the URL (412) may be carried out, for example, by searching internal storage (410), where internal storage may be implemented as shown in Table 1, for the URL and reading a preferred browser identification (414) associated with the URLs (412) in such a table.

Figure 5:
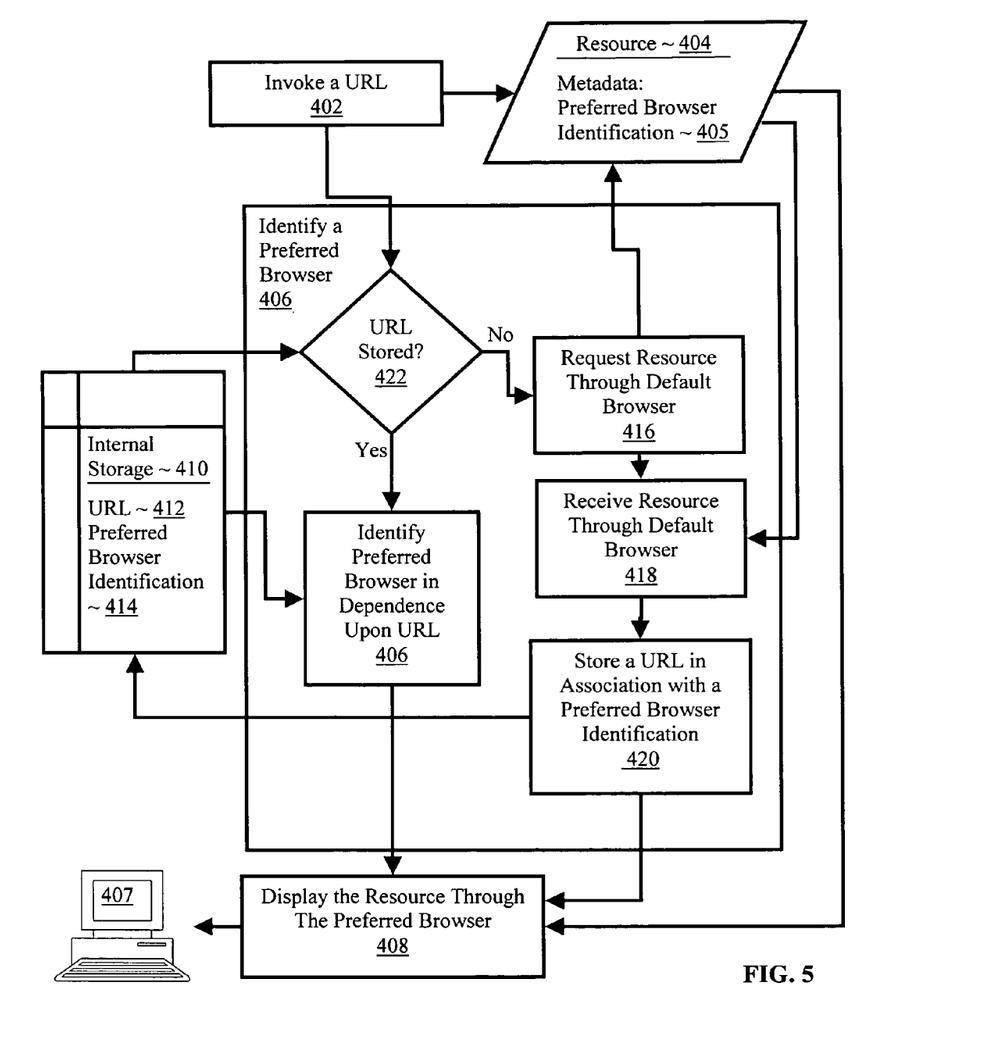
FIG. 5 sets forth an exemplary method of displaying a computer resource through a preferred browser in which no preferred browser identification has been stored for the URL.

For further explanation, FIG. 5 sets forth an exemplary method of displaying a computer resource through a preferred browser in which no preferred browser identification has been stored for the URL (412). The method of FIG. 5 includes checking (422) to determine whether the invoked URL has been stored in association with an identification of its preferred browser, and, if there is one, identifying the preferred browser from the URL (406) and proceeding to display the resource identified by the URL through the preferred browser (408), all as described above in connection with the method of FIG. 4. If the URL was not previously stored in association with an identification of a preferred browser, however, the method of FIG. 5 proceeds by requesting (418) the resource through a default browser and receiving (418) the resource in the default browser. In the example of FIG. 5, the default browser is configured in an operating system, desktop, or other execution context, and the resource (404) identified by the URL contains meta-data (405) that includes an identification of the preferred browser. When the default browser receives the resource including its metadata including the identification of the preferred browser, the default browser, being a software program product improved according to embodiments of the present invention, identifies the preferred browser for the resource and displays (408) the resource (404) through the preferred browser (407). The default browser may call the preferred browser directly through a system call, or through a DDE ('Dynamic Data Exchange') call, through an OLE ('Object Linking and Embedding') call, or otherwise, as will occur to those of skill in the art.

The use of a default browser (416, 418) in the method of FIG. 5 was occasioned by the fact that the URL had not been previously stored in association with an identification of its preferred browser. The method of FIG. 5 therefore advantageously includes storing (420) the URL (412) in association with the identification (414) of the preferred browser, so that the next time that URL is invoked from the execution environment where the association is stored, the preferred browser for the resource identified by that URL may be identified from storage without the need for the additional use of a default browser.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for displaying a computer resource through a preferred browser, the method comprising:

invoking, by a computing device, a URL that identifies a computer resource stored on another computing device;

identifying, among a plurality of available browsers on the computing device, a preferred browser for the resource, including requesting the resource through a default browser, and receiving the resource in the default browser, the resource having meta-data comprising an identification of the preferred browser, wherein the preferred browser is not the default browser;

displaying, by the computing device, the resource through the preferred browser; and storing the URL in association with an identification of the preferred browser, wherein identifying a preferred browser for the resource further comprises identifying the preferred browser in dependence upon the URL.

2. The method of claim 1 wherein invoking a URL further comprises invoking a hyperlink.

3. The method of claim 1 wherein invoking a URL further comprises entering the URL in an address bar in a GUI toolbar of a software application program.

4. A system for displaying a computer resource through a preferred browser, the system comprising:

means for invoking, by a computing device, a URL that identifies a computer resource stored on another computing device;

means for identifying, among a plurality of available browsers on the computing device, a preferred browser for the resource, including means for requesting the resource through a default browser, and means for receiving the resource in the default browser, the resource having meta-data comprising an identification of the preferred browser, wherein the preferred browser is not the default browser;

means for displaying, by the computing device, the resource through the preferred browser; and means for storing the URL in association with an identification of the preferred browser, wherein means for identifying a preferred browser for the resource further comprises means for identifying the preferred browser in dependence upon the URL.

5. The system of claim 4 wherein means for invoking a URL further comprises means for invoking a hyperlink.

6. The system of claim 4 wherein means for invoking a URL further comprises means for entering the URL in an address bar in a GUI toolbar of a software application program.

7. A computer program product for displaying a computer resource through a preferred browser, the computer program product comprising:

a recording medium;

means, recorded on the recording medium, for invoking, by a computing device, a URL that identifies a computer resource stored on another computing device;

means, recorded on the recording medium, for identifying, among a plurality of available browsers on the computing device, a preferred browser for the resource, including means, recorded on the recording medium, for requesting the resource through a default browser, and means, recorded on the recording medium, for receiving the resource in the default browser, the resource having meta-data comprising an identification of the preferred browser, wherein the preferred browser is not the default browser;

means, recorded on the recording medium, for displaying, by the computing device, the resource through the preferred browser; and means, recorded on the recording medium, for storing the URL in association with an identification of the preferred browser, wherein means, recorded on the recording medium, for identifying a preferred browser for the resource further comprises means, recorded on the recording medium, for identifying the preferred browser in dependence upon the URL.

8. The computer program product of claim 7 wherein means, recorded on the recording medium, for invoking a URL further comprises means, recorded on the recording medium, for invoking a hyperlink.

9. The computer program product of claim 7 wherein means, recorded on the recording medium, for invoking a URL further comprises means, recorded on the recording medium, for entering the URL in an address bar in a GUI toolbar of a software application program.

\* \* \* \* \*